United States Patent
Youn et al.

(10) Patent No.: US 10,197,820 B2
(45) Date of Patent: Feb. 5, 2019

(54) QUANTUM DOT, COMPOSITION COMPRISING SAME, AND METHOD OF MANUFACTURING QUANTUM DOT

(71) Applicant: SAMSUNG SDI CO., LTD., Yongin-si, Gyeonggi-do (KR)

(72) Inventors: Jinsuop Youn, Suwon-si (KR); Obum Kwon, Suwon-si (KR); Jun Woo Lee, Suwon-si (KR); Euihyun Kong, Suwon-si (KR); Jonggi Kim, Suwon-si (KR); Sang Cheon Park, Suwon-si (KR); Onyou Park, Suwon-si (KR); Heeje Woo, Suwon-si (KR); Sungseo Cho, Suwon-si (KR); Hyunjoo Han, Suwon-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/555,718

(22) PCT Filed: Dec. 4, 2015

(86) PCT No.: PCT/KR2015/013266
§ 371 (c)(1),
(2) Date: Sep. 5, 2017

(87) PCT Pub. No.: WO2016/195188
PCT Pub. Date: Dec. 8, 2016

(65) Prior Publication Data
US 2018/0059442 A1 Mar. 1, 2018

(30) Foreign Application Priority Data
Jun. 2, 2015 (KR) .......................... 10-2015-0078028

(51) Int. Cl.
*H01L 29/06* (2006.01)
*H01L 31/00* (2006.01)
(Continued)

(52) U.S. Cl.
CPC .............. *G02F 1/017* (2013.01); *C09K 11/02* (2013.01); *C09K 11/54* (2013.01); *C09K 11/565* (2013.01);
(Continued)

(58) Field of Classification Search
USPC ............... 257/15, 519.3, 519.33, 301.66, 98, 257/E33.066, E33.068, E51.022, 13, 40,
(Continued)

(56) References Cited

U.S. PATENT DOCUMENTS

2007/0102676 A1   5/2007   Lee et al.
2010/0021957 A1   1/2010   Lin et al.
(Continued)

FOREIGN PATENT DOCUMENTS

KR   10-2007-0048996 A   5/2007
KR   10-2007-0101293 A   10/2007
(Continued)

OTHER PUBLICATIONS

Mark Green, The nature of quantum dot capping ligands, J. Mater. Cheml, 2010, 20, 5797-5809.
Song, et al., Amine-derived synthetic approach to color-tunable InP/ZnS quantum dots with high fluorescent qualities, J. Nanopart Res., Mar. 2013, 15:1750, p. 1-10.
(Continued)

*Primary Examiner* — Tram H Nguyen
(74) *Attorney, Agent, or Firm* — Lee & Morse, P.C.

(57) ABSTRACT

Provided are quantum dots passivated by oligomers or polymers which are formed by a reaction of a first monomer having at least three thiol groups (—SH) at the terminal end
(Continued)

with a second monomer having at least two functional groups at the terminal end that can react with the thiol groups, and a spacer group between the at least two functional groups.

15 Claims, 8 Drawing Sheets

(51) Int. Cl.
    *G02F 1/017*     (2006.01)
    *C09K 11/02*     (2006.01)
    *C09K 11/54*     (2006.01)
    *C09K 11/70*     (2006.01)
    *G02F 1/1337*     (2006.01)
    *C09K 11/56*     (2006.01)
    *C09K 11/88*     (2006.01)

(52) U.S. Cl.
    CPC ............ *C09K 11/70* (2013.01); *C09K 11/883* (2013.01); *G02F 1/133711* (2013.01); *G02F 2001/01791* (2013.01)

(58) Field of Classification Search
    USPC .......... 257/441, 465, 466, 72; 977/774, 779, 977/773, 810, 834, 902, 950
    See application file for complete search history.

(56) References Cited

U.S. PATENT DOCUMENTS

| | | |
|---|---|---|
| 2010/0117110 A1 | 5/2010 | Park et al. |
| 2011/0104052 A1 | 5/2011 | Barnett et al. |
| 2014/0238480 A1 | 8/2014 | MacDonald et al. |
| 2015/0083970 A1 | 3/2015 | Koh et al. |
| 2015/0098212 A1* | 4/2015 | Won .................. G02F 1/133615 362/97.3 |

FOREIGN PATENT DOCUMENTS

| | | |
|---|---|---|
| KR | 10-2011-0082452 A | 7/2011 |
| KR | 10-1110356 B1 | 2/2012 |
| KR | 10-2012-0138165 A | 12/2012 |
| KR | 10-2013-0046308 A | 5/2013 |
| KR | 10-2014-0006310 A | 1/2014 |
| KR | 10-2015-0034013 A | 4/2015 |

OTHER PUBLICATIONS

Liras, et al., Acetyl protected thiol methacrylic polymers as effective ligands to keep quantum dots in luminescent standby mode, Polymer Chemistry, 2014, 5, 433-442.

Gui, et al., Water-soluble multidentate polymers compactly coating $Ag_2S$ quantum dots with minimized hydrodynamic size and bright emission turnable from red to second near-infrared region, Nanoscale, 2014, 6, 5467-5473.

* cited by examiner

QUANTUM DOT, COMPOSITION COMPRISING SAME, AND METHOD OF MANUFACTURING QUANTUM DOT

CROSS REFERENCE TO RELATED APPLICATIONS

This is the U.S. national phase application based on PCT Application No. PCT/KR2015/013266, filed Dec. 4, 2015, which is based on Korean Patent Application No. 10-2015-0078028 filed Jun. 2, 2015, the entire contents of all of which are hereby incorporated by reference.

TECHNICAL FIELD

A quantum dot, a composition including the same, and a method of preparing the same are disclosed.

BACKGROUND ART

Quantum dots are a semiconductor material with a nano-sized and crystalline structure, and include hundreds to thousands of atoms.

Since the quantum dots are very small, they have a large surface area per unit volume, and also have a quantum confinement effect. Accordingly, they have unique physico-chemical properties that differ from the inherent characteristics of a corresponding bulk semiconductor material.

In particular, since optoelectronic properties of quantum dots may be controlled by adjusting their size, the quantum dots are being actively researched and applied to display devices and biotechnology applications.

Generally, when the quantum dots are applied to a display element or the like, a silicone polymer may be used as a matrix resin for dispersing the quantum dots. However, since the silicone resin has bad compatibility with the organic ligand present in the surface of quantum dots, the quantum dots may be aggregated. In this case, the organic ligand present in the surface of quantum dots may be lost, so the device efficiency may be decreased.

DISCLOSURE

Technical Problem

One embodiment provides a quantum dot having improved stability against oxygen and moisture, improved thermal stability and optical stability, and improved dispersity in a solvent or a matrix resin used during formation of a film by efficiently passivating the surface of the quantum dot.

Another embodiment provides a composition including the quantum dot.

Yet another embodiment provides a method of preparing the quantum dot.

Technical Solution

According to one embodiment, a quantum dot passivated by a oligomer or a polymer obtained by reacting a first monomer having at least three thiol groups (—SH) at the terminal end and a second monomer having at least two functional groups at the terminal end being capable of reacting with the thiol group and a spacer group between the at least two functional groups is provided.

The oligomer or the polymer may be a multidentate ligand including a thiol group at the terminal end.

The oligomer or the polymer may passivate the quantum dot by forming a three-dimensional network on the surface of the quantum dot.

The quantum dot may be selected from an InP quantum dot; a quantum dot including an InP core and a shell including ZnS, ZnSe, or a combination thereof; and a combination thereof.

The first monomer may be represented by Chemical Formula 1.

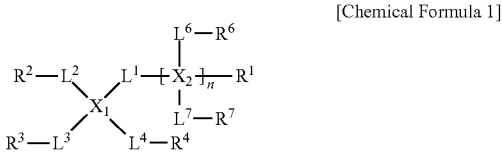

[Chemical Formula 1]

In Chemical Formula 1, $X^1$ and $X^2$ are each independently selected from carbon, a substituted or unsubstituted C6 to C30 arylene group, a substituted or unsubstituted C6 to C30 heteroarylene group, a substituted or unsubstituted C3 to C30 cycloalkylene group, and a substituted or unsubstituted C3 to C30 heterocycloalkylene group;

$L^1$ to $L^7$ are independently selected from a single bond; a substituted or unsubstituted C1 to C30 alkylene group, a substituted or unsubstituted C2 to C30 alkenylene group, and a C1 to C30 alkylene group and a C2 to C30 alkenylene group in which at least one methylene (—$CH_2$—) is replaced by a substituent selected from sulfonyl (—S(=O)$_2$—), carbonyl (—C(=O)—), ether (—O—), sulfide (—S—), sulfoxide (—S(=O)—), ester (—C(=O)O—), amide (—C(=O)$NR^a$—) (wherein $R^a$ is hydrogen or a C1 to C10 alkyl group), imine (—$NR^b$—) (wherein $R^b$ is hydrogen or a C1 to C10 alkyl group), and a combination thereof;

$R^1$ to $R^7$ are independently selected from hydrogen, a thiol group, a substituted or unsubstituted C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, and a substituted or unsubstituted C2 to C30 alkynyl group; and n is an integer of 0, 1, or 2, and when n is 0, at least three of $R^1$ to $R^4$ are thiol groups, while when n is 1 or 2, at least three of $R^1$ to $R^7$ are thiol groups.

The first monomer may be selected from dipentaerythritol hexakis (3-mercaptopropionate, DHM), pentaerythritol tetrakis(3-mercaptopropionate), trimethylolpropane tris(3-mercaptopropionate), pentaerythritol tetrakis(3-mercaptoacetate), trimethylolpropane tris(3-mercaptoacetate), tris[2-(3-mercaptopropionyloxy)ethyl]isocyanurate, tricyanuric acid, and a combination thereof.

The second monomer may be represented by Chemical Formula 2.

[Chemical Formula 2]

In Chemical Formula 2,

L is a spacer group, $R^{12}$ is selected from hydrogen, a thiol group, a substituted or unsubstituted C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, and a substituted or unsubstituted C2 to C30 alkynyl group;

$R^{11}$ is selected from a single bond, a substituted or unsubstituted C1 to C30 alkylene group, a C1 to C30 alkylene group in which at least one non-adjacent methylene group (—CH$_2$—) is replaced by ether (—O—), sulfonyl (—S(=O)$_2$—), carbonyl (—C(=O)—), sulfide (—S—), sulfoxide (—S(=O)—), ester (—C(=O)O—), amide (—C(=O)NR$^a$—) (wherein R$^a$ is hydrogen or a C1 to C10 alkyl group), imine (—NR$^b$—) (wherein R$^b$ is hydrogen or a C1 to C10 alkyl group), and a combination thereof, a substituted or unsubstituted C6 to C30 arylene group, and a combination thereof;

$Y^1$ is selected from a functional group having a carbon-carbon unsaturated bond, a thiol group, and a combination thereof;

p is an integer of 0 or more; q is an integer of 2 or more; and p+q does not exceed the valance of L.

The spacer group may be selected from a substituted or unsubstituted alkylene group including 4 or more carbons, a substituted or unsubstituted cycloalkylene group or heterocycloalkylene group in which two or more monocyclic rings are linked by at least one linker or fused with each other, a substituted or unsubstituted arylene group or heteroarylene group in which two or more aromatic rings are linked by at least one linker or fused with each other, and a combination thereof.

The second monomer may be selected from a cycloalkanediol di(meth)acrylate such as tricyclodecane dimethanol di(meth)acrylate; an alkanediol di(meth)acrylate such as hexanediol di(meth)acrylate, 1,8-octanediol di(meth)acrylate, 1,9-nonanediol di(meth)acrylate, and 1,10-decanediol di(meth)acrylate; 2,2'-(ethylenedioxydiethane)dithiol; 9,9-bis[4-(2-(meth)acryloyloxy ethoxy) phenyl]fluorene; 2,2-bis [4-((meth)acryloxy polypropoxy)phenyl]propane; an alkylene glycol di(meth)acrylate such as dipropylene glycol di(meth)acrylate; tris(2-acryloxyethyl) isocyanurate; trimethylol propane tri(meth)acrylate, ditrimethylol propane tetra(meth)acrylate; 2,2-bis[4-((meth)acryloxyethoxy)phenyl]propane; neopentylglycol di(meth)acrylate; and a combination thereof.

The oligomer or the polymer may be present in an amount of about 80 to about 100 parts by weight based on 100 parts by weight of the passivated quantum dot.

According to another embodiment, a composition includes a quantum dot passivated by a oligomer or a polymer obtained by reacting a first monomer having at least three thiol groups (—SH) at the terminal end and a second monomer having at least two functional groups at the terminal end being capable of reacting with the thiol group and a spacer group between the at least two functional groups; a monomer of a matrix polymer; and a solvent.

The first monomer, the second monomer, and the quantum dot are the same as described above.

The monomer of the matrix polymer may be a monomer that provides a polymer selected from an acrylic resin, a methacrylic resin, a silicone resin, a thiol-ene resin, and a combination thereof.

The solvent may be selected from toluene, benzene, chloroform, dichloromethane, tetrahydrofuran, trioctylamine, xylene, dimethylsulfoxide, dimethyl formamide, and a combination thereof.

The passivated quantum dot may be present in an amount of about 0.1 to about 20 wt % based on the total amount of the composition.

According to another embodiment, a method of preparing a passivated quantum dot includes: preparing a solution including a multidentate oligomer by reacting a first monomer having at least three thiol groups (—SH) at the terminal end and a second monomer having at least two functional groups at the terminal end being capable of reacting with the thiol group and a spacer group between the at least two functional groups; and mixing the solution with a quantum dot to attach the thiol group of the multidentate oligomer on the surface of the quantum dot.

According to yet another embodiment, a film including the passivated quantum dot is provided.

According to still another embodiment, a device including the film is provided.

Advantageous Effects

The quantum dot passivated by an oligomer or a polymer may have improved stability against oxygen or moisture and improved thermal stability and optical stability, and be well dispersed in a solvent or a matrix resin used during formation of a film.

MODE FOR INVENTION

Figure 1:
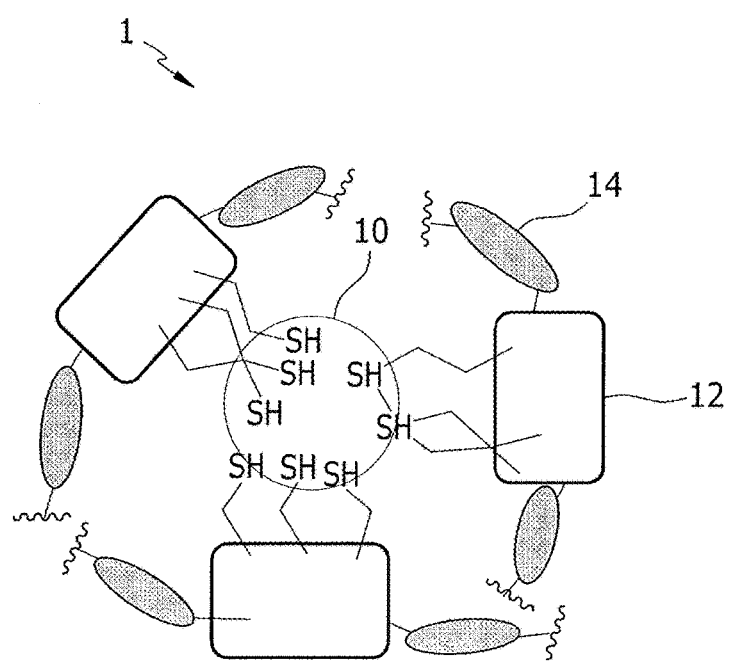
FIG. 1 is a schematic view showing a passivated quantum dot according to one embodiment.

This disclosure will be described more fully hereinafter in the following detailed description, in which some but not all embodiments of this disclosure are described. However, this disclosure may be embodied in many different forms, and is not construed as limited to the exemplary embodiments set forth herein.

In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, the term "substituted" may refer to a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group (NRR', wherein R and R' are independently hydrogen or a C1 to C6 alkyl group), an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), an ester group (—C(=O)OR, wherein R is a C1 to C6 alkyl group or a C6 to C12 aryl group), a carboxyl group (—C(=O)OH) or a salt thereof (—C(=O)OM wherein M is an organic or inorganic cation), a sulfonic acid group (—SO$_3$H) or a salt thereof (—SO$_3$M wherein M is an organic or inorganic cation), or a phosphoric acid group (—PO$_3$H$_2$) or a salt thereof (—PO$_3$MH or —PO$_3$M$_2$ wherein M is an organic or inorganic cation), instead of hydrogen, provided that the substituted atom's normal valence is not exceeded.

As used herein, when a definition is not otherwise provided, the prefix "hetero" refers to one that includes a heteroatom or a heteroatom-containing group (e.g., 1 to 4 heteroatoms or heteroatom-containing groups, each independently N, O, S, Si, P, C(=O), S(=O), or S(=O)$_2$) in a ring. The total number of ring members may be 3 to 10.

As used herein, the term alkane refers to a C6 to C30 alkane and the term alkylene refers to a C6 to C30 alkylene.

As used herein, the term "combination thereof" refers to a mixture, a stacked structure, a composite, an alloy, a blend, a cross-substitution product, a reaction product, and the like.

According to one embodiment, a quantum dot passivated by a oligomer or a polymer obtained by reacting a first monomer having at least three thiol groups (—SH) at the terminal end and a second monomer having at least two functional groups at the terminal end being capable of reacting with the thiol group and a spacer group between the at least two functional groups, is provided.

Hereinafter, referring to FIG. 1, a quantum dot according to one embodiment is described.

FIG. 1 is a schematic view of a passivated quantum dot according to one embodiment.

Referring to FIG. 1, a passivated quantum dot 1 according to one embodiment includes an oligomer or a polymer surrounding the surface of a quantum dot (a bare QD, 10). The oligomer or the polymer includes a chelating domain 12 and a spacer group 14 substituting a ligand of the quantum dot and attached on the surface of the quantum dot In addition, a thiol group present at the terminal end of the oligomer or polymer may play a role of an anchor group bonded on the surface of the quantum dot.

The oligomer or polymer may be a multidentate ligand including the thiol group at the terminal end. The thiol group is bonded with the surface of the quantum dot 10 and passivates the quantum dot 10, and the multidentate ligand is bonded with another multidentate ligand and forms a three-dimensional network and thus stabilizes the quantum dot 10.

In addition, the oligomer or polymer may be used to passivate greater than or equal to about two quantum dots. The spacer group maintains a predetermined distance among the quantum dots and prevents agglomeration of the quantum dots, and thus may improve dispersity.

The quantum dot 10 may be a quantum dot emitting red, green, yellow, or blue light. The quantum dot may be a Group II-VI compound, a Group III-V compound, a Group IV-VI compound, a Group IV element, a Group IV compound, or a combination thereof.

The Group II-VI compound includes a binary compound selected from CdSe, CdTe, ZnS, ZnSe, ZnTe, ZnO, HgS, HgSe, HgTe, MgSe, MgS, and a mixture thereof; a ternary compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; or a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound includes a binary compound selected from GaN, GaP, GaAs, GaSb, AlN, AlP, AlAs, AlSb, InN, InP, InAs, InSb, and a mixture thereof; a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; or a quaternary compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound includes a binary compound selected from SnS, SnSe, SnTe, PbS, PbSe, PbTe, and a mixture thereof; a ternary compound selected from SnSeS, SnSeTe, SnSTe, PbSeS, PbSeTe, PbSTe, SnPbS, SnPbSe, SnPbTe, and a mixture thereof; or a quaternary compound selected from SnPbSSe, SnPbSeTe, SnPbSTe, and a mixture thereof. The Group IV element includes Si, Ge, or a mixture thereof. The Group IV compound includes a binary compound selected from SiC, SiGe, or a mixture thereof.

In one embodiment, the quantum dot 10 may be selected from an InP quantum dot, a quantum dot including an InP core and a shell of ZnS or ZnSe, and a combination thereof.

The oligomer or polymer may be prepared by reacting the first monomer having at least three thiol groups (—SH) at the terminal end and the second monomer having at least two functional groups at the terminal end being capable of reacting with the thiol group and a spacer group between the at least two functional groups.

The first monomer may be represented by Chemical Formula 1.

[Chemical Formula 1]

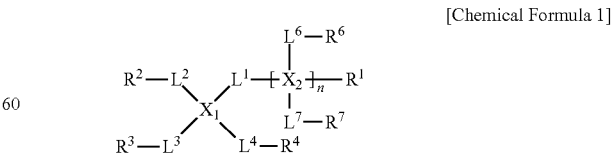

In Chemical Formula 1,

X$^1$ and X$^2$ are each independently carbon, a substituted or unsubstituted C6 to C30 arylene group (e.g., a substituted or unsubstituted phenylene group), a substituted or unsubstituted C6 to C30 heteroarylene group (e.g., an isocyanurate group, a triazine group, and the like), a substituted or unsubstituted C3 to C30 cycloalkylene group, or a substituted or unsubstituted C3 to C30 heterocycloalkylene group;

$L^1$ to $L^7$ are independently selected from a single bond, a substituted or unsubstituted C1 to C30 alkylene group, a substituted or unsubstituted C2 to C30 alkenylene group, and a C1 to C30 alkylene group and a C2 to C30 alkenylene group, in which at least one methylene (—$CH_2$—) is replaced by a substituent selected from sulfonyl (—S(=O)$_2$—), carbonyl (—C(=O)—), ether (—O—), sulfide (—S—), sulfoxide (—S(=O)—), ester (—C(=O)O—), amide (—C(=O)NR$^a$—) (wherein R$^a$ is hydrogen or a C1 to C10 alkyl group), imine (—NR$^b$—) (wherein R$^b$ is hydrogen or a C1 to C10 alkyl group), and a combination thereof;

$R^1$ to $R^7$ are independently selected from hydrogen, a thiol group, a substituted or unsubstituted C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, and a substituted or unsubstituted C2 to C30 alkynyl group; and n is an integer of 0, 1, or 2, and when n is 0, at least three of $R^1$ to $R^4$ are thiol groups, while when n is 1 or 2, at least three of $R^1$ to $R^7$ are thiol groups.

The first monomer may include 3 to 10 thiol groups. Examples of the first monomer may be selected from dipentaerythritol hexakis(3-mercaptopropionate) (DHM) of Chemical Formula 1a, pentaerythritol tetrakis(3-mercaptopropionate) of Chemical Formula 1b, trimethylolpropane tris(3-mercaptopropionate) of Chemical Formula 1c, pentaerythritol tetrakis(3-mercaptoacetate) of Chemical Formula 1d, trimethylolpropane tris(3-mercaptoacetate) of Chemical Formula 1e, tris[2-(3-mercaptopropionyloxy)ethyl]isocyanurate of Chemical Formula 1f, tricyanuric acid of Chemical Formula 1g, and a combination thereof.

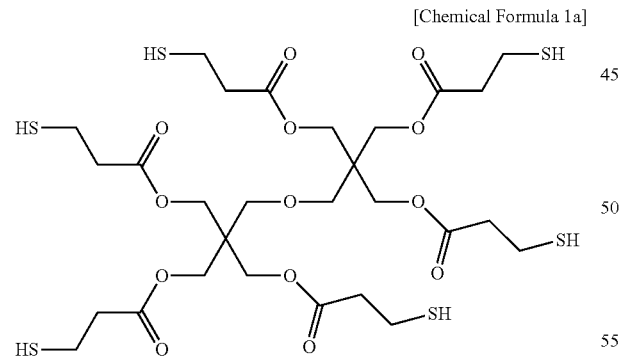

[Chemical Formula 1a]

[Chemical Formula 1b]

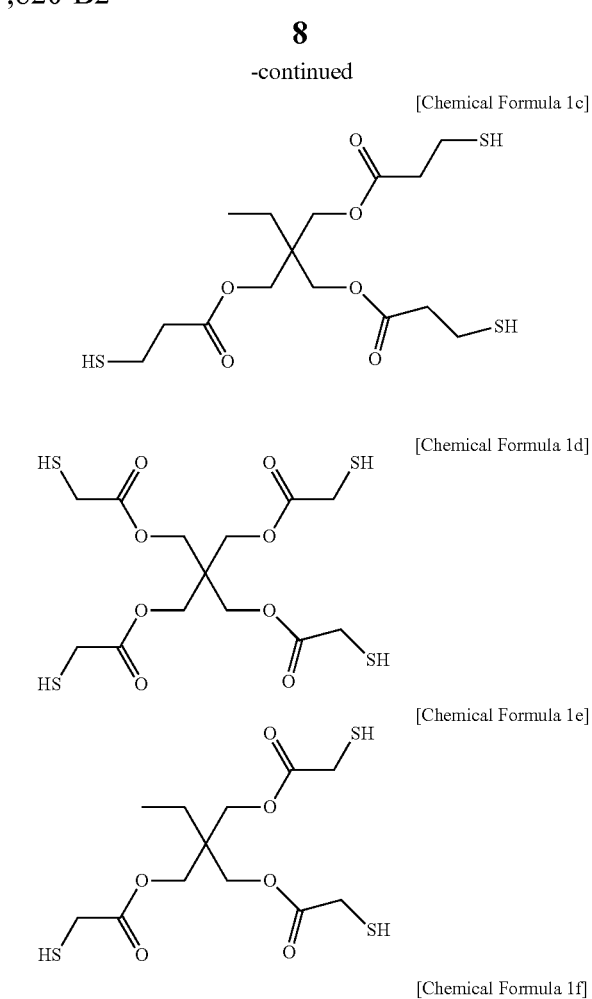

[Chemical Formula 1c]

[Chemical Formula 1d]

[Chemical Formula 1e]

[Chemical Formula 1f]

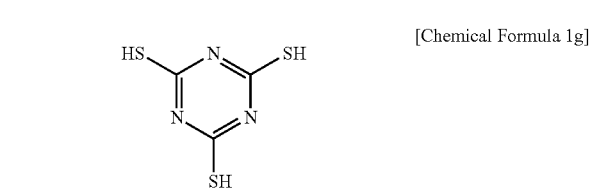

[Chemical Formula 1g]

The second monomer may be represented by Chemical Formula 2.

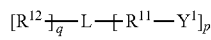

[Chemical Formula 2]

In Chemical Formula 2,

L is a spacer group;

$R^{12}$ is selected from hydrogen, a thiol group, a substituted or unsubstituted C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, and a substituted or unsubstituted C2 to C30 alkynyl group;

$R^{11}$ is selected from a single bond, a substituted or unsubstituted C1 to C30 alkylene group, a C1 to C30 alkylene group in which at least one non-adjacent methylene group (—$CH_2$—) is replaced by ether (—O—), sulfonyl (—S(=O)$_2$—), carbonyl (—C(=O)—), sulfide (—S—), sulfoxide (—S(=O)—), ester (—C(=O)O—), amide (—C(=O)NR$^a$—) (wherein R$^a$ is hydrogen or a C1 to C10 alkyl group), imine (—NR$^b$—) (wherein R$^b$ is hydrogen or a C1 to C10 alkyl group), and a combination thereof, a substituted or unsubstituted C6 to C30 arylene group, and a combination thereof;

$Y^1$ is selected from a functional group having a carbon-carbon unsaturated bond, a thiol group, and a combination thereof;

p is an integer of 0 or more; q is an integer of 2 or more; and p+q does not exceed the valance of L.

The spacer group may be selected from a substituted or unsubstituted alkylene group including 4 or more, 6 or more, or 8 or more carbons; a substituted or unsubstituted cycloalkylene group or heterocycloalkylene group in which two or more monocyclic rings are linked by at least one linker or fused with each other; a substituted or unsubstituted arylene group or heteroarylene group in which two or more aromatic rings are linked by at least one linker or fused with each other; and a combination thereof.

The functional group having a carbon-carbon unsaturated bond may be selected from a substituted or unsubstituted C2 to C30 alkenyl group, a substituted or unsubstituted C2 to C30 alkynyl group, an acryloyloxy group, a methacryloyloxy group, a substituted or unsubstituted C3 to C30 cycloalkyl group including a carbon-carbon unsaturated bond in a ring, and a substituted or unsubstituted C3 to C30 heterocycloalkyl group including a carbon-carbon unsaturated bond in a ring.

Examples of the alkenyl group or alkynyl group may be a vinyl group, an allyl group, an ethynyl group, and the like; and the substituted or unsubstituted C3 to C30 cycloalkyl group including a carbon-carbon unsaturated bond in a ring, and the substituted or unsubstituted C3 to C30 heterocycloalkyl group including a carbon-carbon unsaturated bond in a ring, may be selected from a norbornene group, a maleimide group, a nadimide group, a tetrahydrophthalimide group, and a combination thereof.

The spacer group may be an alkylene group where at least one methylene group (—$CH_2$—) is replaced by a substituent selected from ether (—O—), sulfonyl (—S(=O)$_2$—), carbonyl (—C(=O)—), sulfide (—S—), sulfoxide (—S(=O)—), ester (—C(=O)O—), amide (—C(=O)NR$^a$—) (wherein R$^a$ is hydrogen or a C1 to C10 alkyl group), imine (—NR$^b$—) (wherein R$^b$ is hydrogen or C1 to C10 alkyl group), and a combination thereof.

The linker of the spacer group may be a single bond or a C1 to C10 substituted or unsubstituted alkylene group. Herein, in the alkylene group, at least one methylene (—$CH_2$—) is replaced by a substituent selected from sulfonyl (—S(=O)$_2$—), carbonyl (—C(=O)—), ether (—O—), sulfide (—S—), sulfoxide (—S(=O)—), ester (—C(=O)O—), amide (—C(=O)NR$^a$—) (wherein R$^a$ is hydrogen or a C1 to C10 alkyl group), imine (—NR$^b$—) (wherein R$^b$ is hydrogen or a C1 to C10 alkyl group), and a combination thereof.

The first monomer may include 3 to 10 functional groups ($Y^1$) selected from a functional group having a carbon-carbon unsaturated bond, a thiol group, and a combination thereof. The second monomer may be selected from a cycloalkanediol di(meth)acrylate such as tricyclodecane dimethanol di(meth)acrylate; an alkanediol di(meth)acrylate such as hexanediol di(meth)acrylate, 1,8-octanediol di(meth)acrylate, 1,9-nonanediol di(meth)acrylate, and 1,10-decanediol di(meth)acrylate; 2,2'-(ethylenedioxydiethane)dithiol; 9,9-bis[4-(2-(meth)acryloyloxy ethoxy) phenyl] fluorene; 2,2-bis[4-[(meth)acryloxy polypropoxy]phenyl] propane; an alkylene glycol di(meth)acrylate such as dipropylene glycol di(meth)acrylate; tris(2-acryloxyethyl) isocyanurate; trimethylol propane tri(meth)acrylate, and ditrimethylol propane tetra(meth)acrylate; 2,2-bis[4-[(meth) acryloxyethoxy]phenyl]propane; neopentylglycol di(meth) acrylate; and a combination thereof.

The oligomer or polymer may be present in an amount of about 80 to about 100 parts by weight based on 100 parts by weight of the passivated quantum dot. The oligomer or polymer within the range may stably passivate the quantum dot.

According to another embodiment, a composition includes a quantum dot passivated by a oligomer or a polymer obtained by reacting a first monomer having at least three thiol groups (—SH) at the terminal end and a second monomer having at least two functional groups at the terminal end being capable of reacting with the thiol group and a spacer group between the at least two functional groups; a monomer of a matrix polymer; and a solvent.

The first monomer, the second monomer, and the quantum dot are the same as described above.

The monomer of the matrix polymer may be a monomer that provides a polymer selected from an acrylic resin, a methacrylic resin, a silicone resin, and a thiol-ene resin.

The solvent may be selected from toluene, benzene, chloroform, dichloromethane, tetrahydrofuran, trioctylamine, xylene, dimethylsulfoxide, dimethyl formamide, and a combination thereof.

The passivated quantum dot may be present in an amount of about 0.1 to about 20 wt % based on the total amount of the composition. Within the range, the composition may have appropriate viscosity for coating.

According to another embodiment, a method of preparing a passivated quantum dot includes preparing a solution including a multidentate oligomer by reacting a first monomer having at least three thiol groups (—SH) at the terminal end and a second monomer having at least two functional groups at the terminal end being capable of reacting with the thiol group and a spacer group between the at least two functional groups, and mixing the solution with a quantum dot to attach the thiol group of the multidentate oligomer on the surface of the quantum dot.

A reaction between the first and second monomers may be performed by using a catalyst. The catalyst is used when the quantum dot is not present, and has no influence on quantum efficiency of a quantum dot. In addition, the reaction uses a solvent mainly used in a quantum dot solution and thus does not decrease quantum efficiency of the quantum dot.

As for the multidentate oligomer, functional groups present at the terminal end may react with one another and form a polymer.

In addition, a passivated quantum dot passivated by the oligomer or the polymer may be directly used for a quantum dot composition to be coated on a substrate without purification, and thus improve a yield of a final product.

The passivated quantum dot is stably encapsulated with the oligomer or the polymer on the surface and protected from degradation when exposed to moisture or oxygen in the air. Accordingly, high level quantum efficiency may be obtained, and oxidation resistance and chemical resistance may also be improved.

The composition may be coated on a substrate in a known method and formed into a film. The coating may be performed in a method of screen printing, imprinting, spin coating, dipping, Inkjetting, roll coating, flow coating, drop casting, spray coating, roll printing, and the like, but is not limited thereto.

The quantum dot may be applied to a device in various areas, for example, a light emitting diode (LED), a solar cell, a biosensor, an image sensor, a backlight unit, a lamp, and the like.

Hereinafter, the embodiments are illustrated in more detail with reference to examples. However, these examples are exemplary, and the present disclosure is not limited thereto.

EXAMPLE

Example 1

1.6 g (3.26 mmol) of dipentaerythritol hexakis(3-mercaptopropionate) represented by Chemical Formula 1a (Mw=785.05, 2.04 mmol, Sigma-Aldrich) and 933 mg (3.26 mmol) of tricyclodecane dimethanol diacrylate (A-DCP, Mw=304, Sigma-Aldrich) were dissolved in 12 mL of toluene, while being agitated. Then, 0.1 mL of triethylamine ($Et_3N$) was added thereto, and the mixture was agitated at room temperature for 4 hours, preparing an oligomer solution.

On the other hand, a red quantum dot having an InP core/ZnS shell was synthesized according to a synthesis method disclosed in J. Nanopart. Res. 2013, 1750, and chloroform as a solvent was purchased from Daejung Chemicals Co., Ltd. and used without purification. The red quantum dot (ca. 16 uM, 30 mL) solution was added to the oligomer solution, and the mixture was agitated at room temperature of 24° C. for 3 hours, obtaining a quantum dot solution. This quantum dot solution was immediately used as a quantum dot composition without purification.

Example 2

986 mg (0.92 mmol) of dipentaerythritol hexakis(3-mercaptopropionate) represented by Chemical Formula 1a (Mw=783.05) and 1.55 g (6.44 mmol) of 2,2'-(ethylenedioxydiethane)dithiol (Mw=182.3) were put in a 250 mL triangular flask. Subsequently, 20 mL of dimethyl sulfoxide (DMSO), 20 mL of tetrahydrofuran (THF), and 55 mL of deionized water (DI water) were put in the triangular flask, and the mixture was fervently agitated for 24 hours while being maintained at 35° C. Then, the mixed suspension solution obtained therefrom was diluted by using 150 mL of ethyl acetate (EtOAc), and the diluted resultant was moved to a separatory funnel and layer-separated. After removing a water layer therefrom, an organic layer remaining there was washed by using 200 mL of deionized water and then layer-separated. This process was repeated five times, and the obtained organic layer was washed one more time with 100 mL of brine and dried with $MgSO_4$. The dried organic layer was vacuum-filtered to remove the $MgSO_4$, and was then distilled under a reduced pressure and concentrated. Subsequently, a reactant matrix of the separated compound represented by Chemical Formula 1a and 2,2'-(ethylenedioxydiethane)dithiol were dissolved in 10 mL of THF to prepare an oligomer solution, and the oligomer solution was moved to a 100 mL round-bottomed flask.

On the other hand, a red quantum dot having an InP core/ZnS shell was synthesized according to J. Nanopart. Res. 2013, 1750, and chloroform as a solvent was purchased from Daejung Chemicals Co., Ltd. and used without purification. 10 mL of the red quantum dot (ca. 16 uM) solution was put in a round-bottomed flask, and then agitated at room temperature of 24° C. for 4 hours, obtaining a quantum dot solution. This quantum dot solution was used as a quantum dot composition without purification.

Passivation of Quantum Dot $^1$H NMR of a matrix obtained after removing the solvent from the oligomer solution according to Example 1 was measured.

Figure 2:
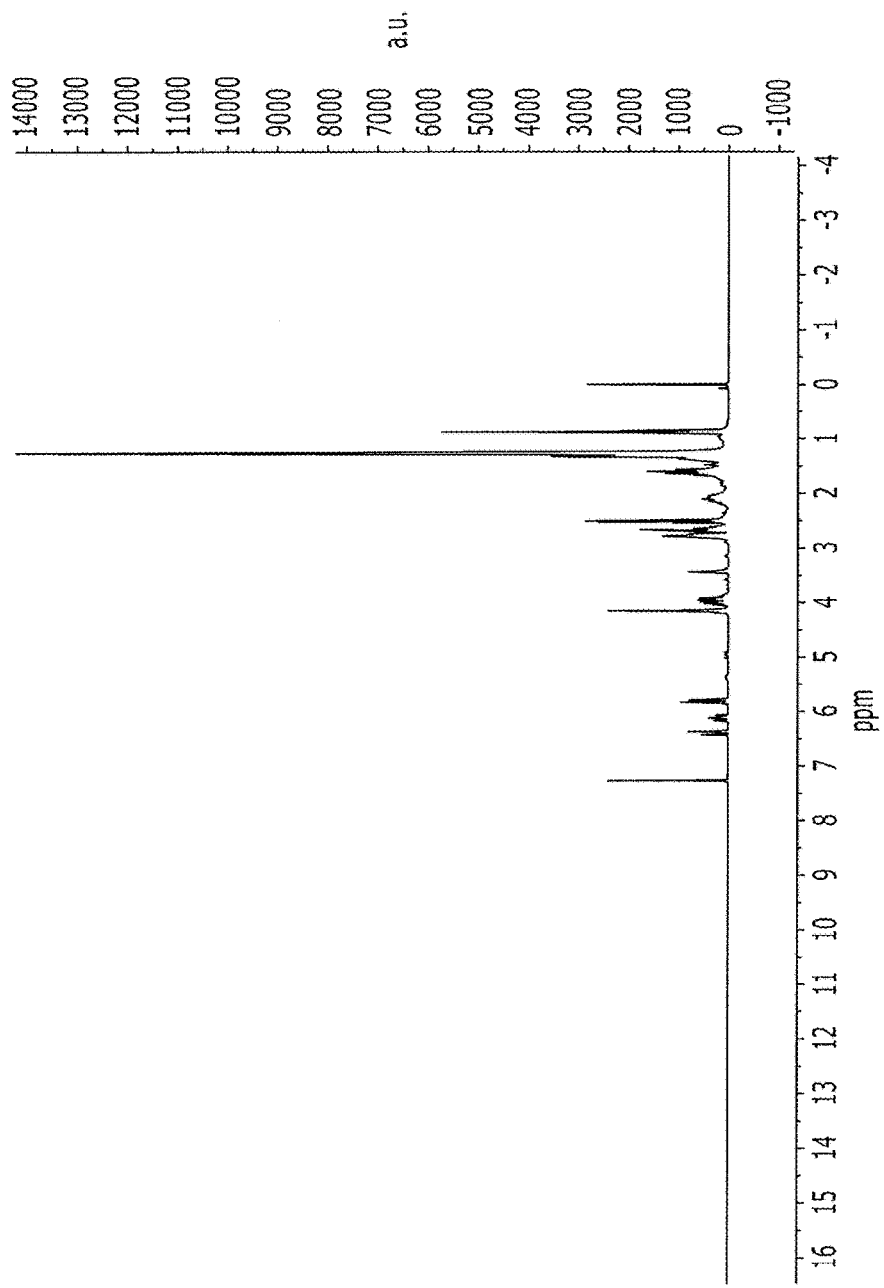
FIG. 2 is a drawing showing the $^1$H NMR result of a matrix obtained after removing a solvent from an oligomer solution according to Example 1.

FIG. 2 shows the $^1$H NMR result of the matrix obtained after removing the solvent from the oligomer solution according to Example 1. Referring to FIG. 2, an oligomer is obtained through a reaction of the dipentaerythritol hexakis (3-mercaptopropionate) represented by Chemical Formula 1a and A-DCP (Sigma-Aldrich).

Figure 3:
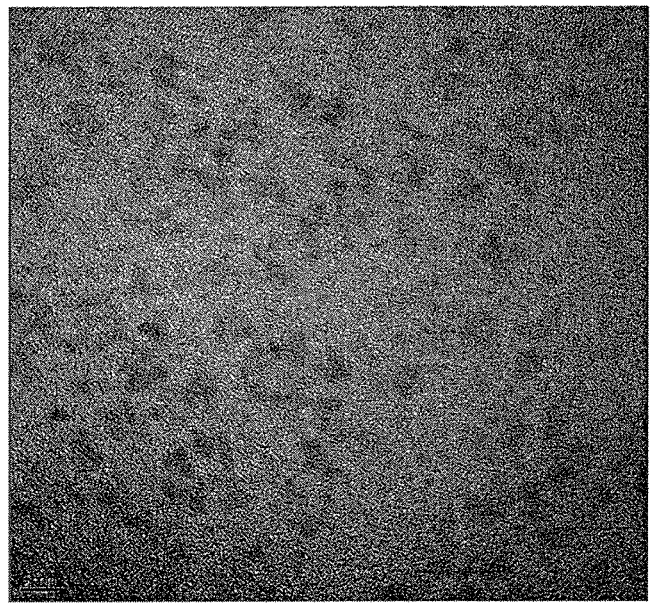
FIGS. 3 and 4 are transmission electron microscope photographs of films obtained by respectively coating the dot solutions according to Examples 1 and 2 and removing a solvent therefrom.
Figure 4:
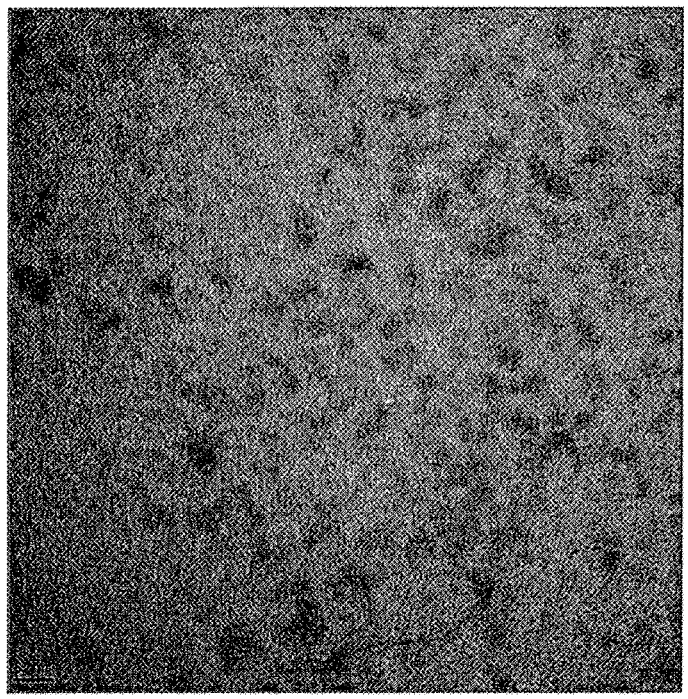
Figure 5:
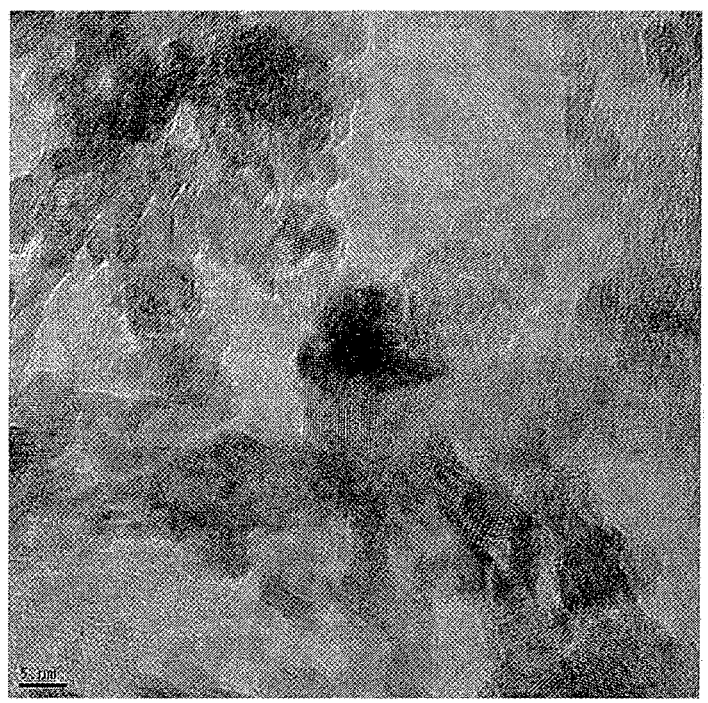
FIG. 5 is a transmission electron microscope photograph showing a film obtained from a non-passivated red quantum dot solution.

Transmission electron microscope photographs of each film obtained by respectively coating the quantum dot solutions according to Examples 1 and 2 and removing a solvent therefrom are respectively shown in FIGS. 3 and 4. For comparison, a transmission electron microscope photograph of a film obtained from a non-passivated red quantum dot solution is shown in FIG. 5. FIGS. 3 and 4 are transmission electron microscope photographs of each film obtained by respectively coating the quantum dot solutions according to Examples 1 and 2 and removing a solvent therefrom, while FIG. 5 is the transmission electron microscope photograph of a film obtained from a non-passivated red quantum dot solution for comparison. The films of FIGS. 3 and 4 show that quantum dots are uniformly distributed at a predetermined distance, but the film of FIG. 5 shows that quantum dots are agglomerated.

Figure 6:
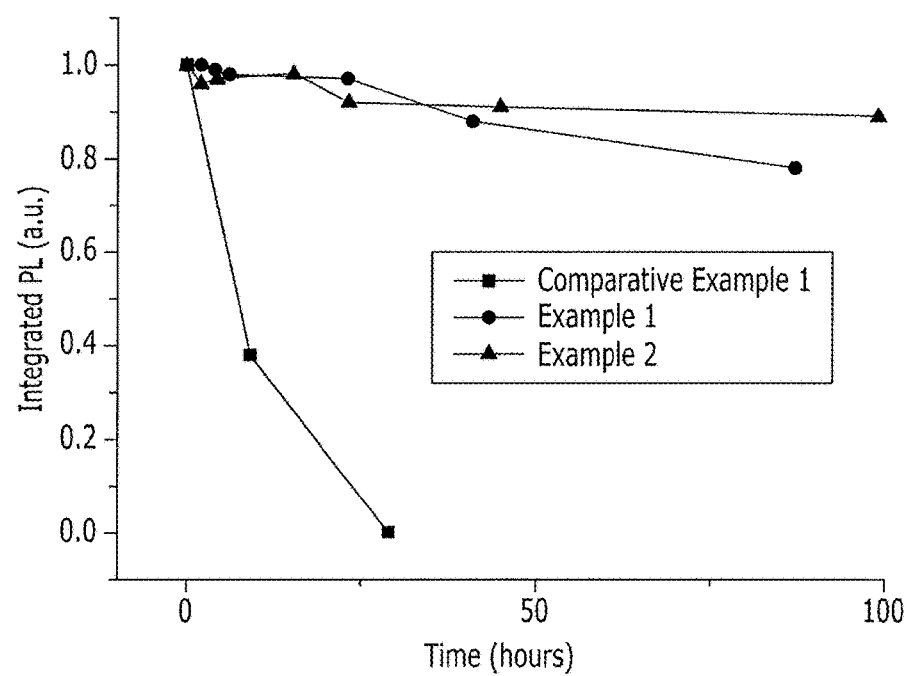
FIG. 6 is a drawing showing PL intensity of samples depending on time at 120° C. under an air condition by obtaining the samples from the passivated quantum dots according to Examples 1 and 2 and a non-passivated quantum dot according to Comparative Example 1.

Thermal Stability of Passivated Quantum Dot 500 mL of each quantum dot solution according to Examples 1 and 2 was mixed with 3 mL of chloroform and diluted. Then, 20 g of A-DCP (Sigma-Aldrich) was mixed with 2 g of the diluted quantum dot solution, and the mixture was agitated for 10 minutes, preparing a quantum dot composition. FIG. 6 shows PL intensity of a sample depending on time at 120° C. under an air condition, and herein, the sample was obtained after removing a solvent therefrom. The sample was obtained in a time interval shown in FIG. 6. FIG. 6 is a drawing showing PL intensity of the passivated quantum dots according to Examples 1 and 2 and the non-passivated quantum dot according to Comparative Example 1 depending on time. Referring to FIG. 6, the passivated quantum dots according to Examples 1 and 2 showed a small PL intensity deviation, while the non-passivated quantum dot according to Comparative Example 1 showed sharply deteriorated PL intensity after 3 hours and almost no PL intensity after 29 hours. Accordingly, the passivated quantum dots according to Examples 1 and 2 showed improved thermal stability compared with the non-passivated quantum dot according to Comparative Example 1.

Figure 7:
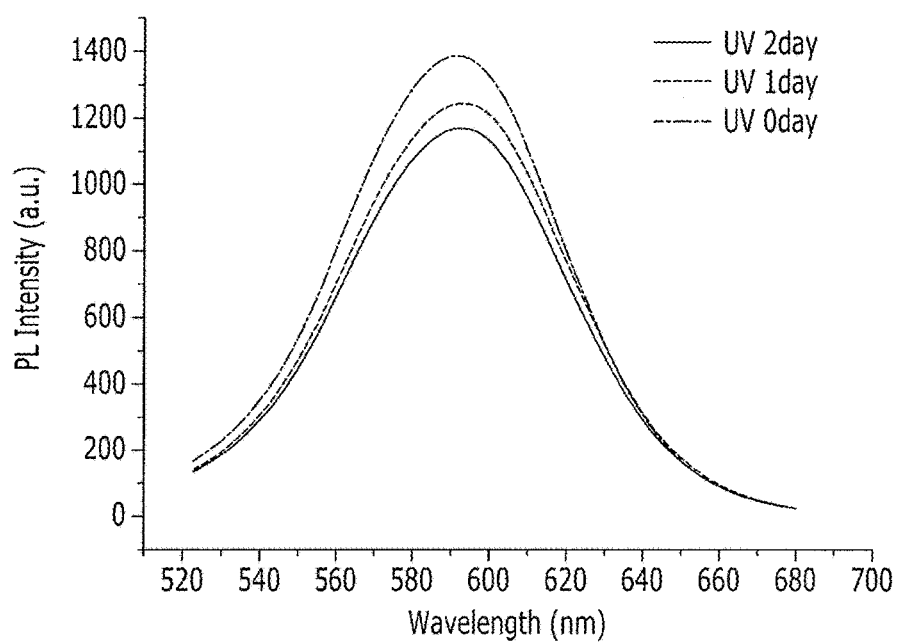
FIGS. 7 and 8 are drawings showing PL intensity results of the passivated quantum dot according to Example 1 and the non-passivated quantum dot according to Comparative Example 1 depending on time in a UV exposure environment.
Figure 8:
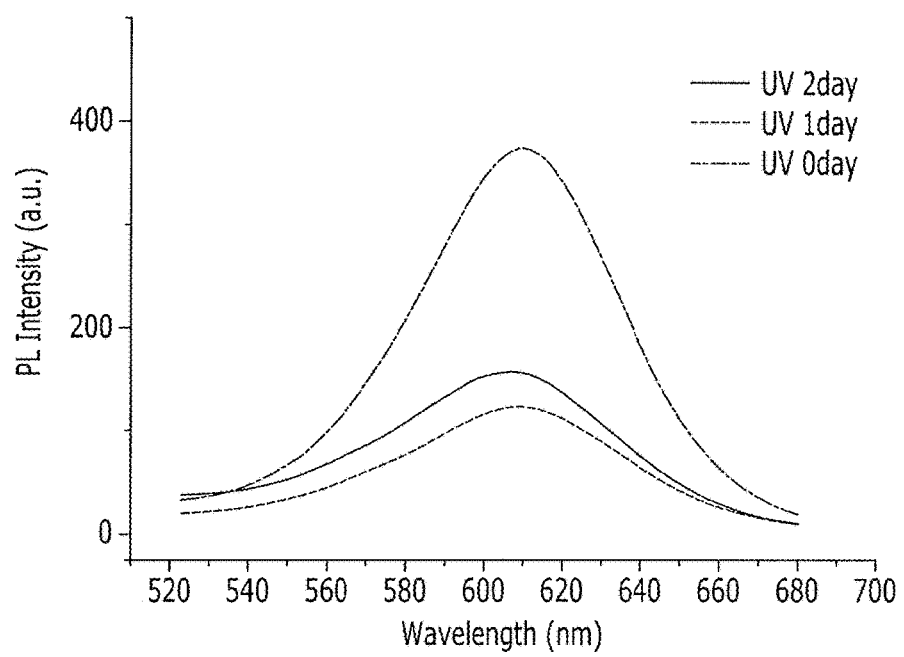

Optical Stability of Passivated Quantum Dot 500 mL of each quantum dot solution according to Examples 1 and 2 was mixed with 20 g of A-DCP (Sigma-Aldrich), and the mixture was agitated for 10 minutes, preparing a quantum dot composition. PL was measured by taking a sample at every evaluation time and using UV equipment (14.7 W lamp, a wavelength ranging from 280 to 360 nm and that peaked at 306 nm). On the other hand, a sample was taken from the non-passivated quantum dot solution according to Comparative Example 1, and its PL was measured. The PL intensity results of Example 1 and Comparative Example 1 are respectively shown in FIGS. 7 and 8. FIGS. 7 and 8 are drawings showing the PL intensity results of the passivated quantum dot of Example 1 and the non-passivated quantum dot of Comparative Example 1 in a UV exposure environment depending on time. Referring to FIGS. 7 and 8, the quantum dot according to Example 1 showed a small PL intensity change depending on time, while Comparative Example 1 showed sharply deteriorated PL intensity after one day. Accordingly, the quantum dot of Example 1 showed excellent optical stability compared with the quantum dot of Comparative Example 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| | |
|---|---|
| 1: | passivated quantum dot |
| 10: | quantum dot |
| 12: | chelating domain |
| 14: | spacer group |

What is claimed is:

1. A quantum dot passivated by a oligomer or a polymer, the oligomer or the polymer is obtained by reacting a first monomer having at least three thiol groups (—SH) at the terminal end and a second monomer having at least two functional groups at the terminal end being capable of reacting with the thiol groups and a spacer group between the at least two functional groups,
    wherein the second monomer is selected from cycloalkanediol di(meth)acrylate, alkanediol di(meth)acrylate, 2,2'-(ethylenedioxydiethane)dithiol, 9,9-bis[4-(2-(meth)acryloyloxy ethoxy) phenyl]fluorene, 2,2-bis[4-((meth)acryloxy polypropoxy)phenyl]propane, alkylene glycol di(meth)acrylate, tris(2-acryloxyethyl) isocyanurate, trimethylol propane tri(meth)acrylate, ditrimethylol propane tetra(meth)acrylate, 2,2-bis[4-((meth)acryloxyethoxy)phenyl]propane, neopentylglycol di(meth)acrylate, and a combination thereof.

2. The quantum dot of claim 1, wherein the oligomer or the polymer is a multidentate ligand including a thiol group at the terminal end.

3. The quantum dot of claim 1, wherein the oligomer or the polymer passivates the quantum dot by forming a three-dimensional network on a surface of the quantum dot.

4. The quantum dot of claim 1, wherein the quantum dot is selected from an InP quantum dot; a quantum dot including an InP core and a shell including ZnS, ZnSe, or a combination thereof; and a combination thereof.

5. The quantum dot of claim 1, wherein the first monomer is a compound represented by Chemical Formula 1:

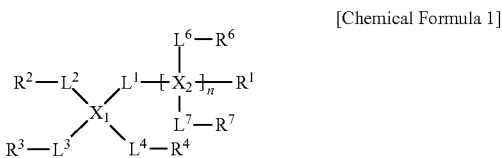

[Chemical Formula 1]

wherein, in Chemical Formula 1,
$X^1$ and $X^2$ are each independently carbon, a substituted or unsubstituted C6 to C30 arylene group, a substituted or unsubstituted C6 to C30 heteroarylene group, a substituted or unsubstituted C3 to C30 cycloalkylene group, or a substituted or unsubstituted C3 to C30 heterocycloalkylene group,
$L^1$ to $L^7$ are independently selected from a single bond; a substituted or unsubstituted C1 to C30 alkylene group; a substituted or unsubstituted C2 to C30 alkenylene group; and a C1 to C30 alkylene group and a C2 to C30 alkenylene group in which at least one methylene (—$CH_2$—) is replaced by a substituent selected from sulfonyl (—S(=O)$_2$—), carbonyl (—C(=O)—), ether (—O—), sulfide (—S—), sulfoxide (—S(=O)—), ester (—C(=O)O—), amide (—C(=O)NR$^a$—) (wherein R$^a$ is hydrogen or a C1 to C10 alkyl group), imine (—NR$^b$—) (wherein R$^b$ is hydrogen or a C1 to C10 alkyl group); and a combination thereof,
$R^1$ to $R^7$ are independently selected from hydrogen, a thiol group, a substituted or unsubstituted C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, and a substituted or unsubstituted C2 to C30 alkynyl group,
n is an integer of 0, 1 or 2, when n is 0, at least three of $R^1$ to $R^4$ are thiol groups, and when n is 1 or 2, at least three of $R^1$ to $R^7$ are thiol groups.

6. The quantum dot of claim 1, wherein the first monomer is selected from dipentaerythritol hexakis(3-mercaptopropionate), pentaerythritol tetrakis(3-mercaptopropionate), trimethylolpropane tris(3-mercaptopropionate), pentaerythritol tetrakis(3-mercaptoacetate), trimethylolpropane tris(3-mercaptoacetate), tris[2-(3-mercaptopropionyloxyethyl)isocyanurate], tricyanuric acid, and a combination thereof.

7. The quantum dot of claim 1, wherein the oligomer or the polymer is present in an amount of about 80 to about 100 parts by weight based on 100 parts by weight of the passivated quantum dot.

8. A composition comprising a quantum dot, the composition including:
    the quantum dot according to claim 1;
    a monomer of a matrix polymer; and
    a solvent.

9. The composition comprising a quantum dot of claim 8, wherein the monomer of the matrix polymer is a monomer that provides a polymer selected from an acrylic resin, a methacrylic resin, a silicone resin, a thiol-ene resin, and a combination thereof.

10. The composition comprising a quantum dot of claim 8, wherein the solvent is selected from toluene, benzene, chloroform, dichloromethane, tetrahydrofuran, trioctylamine, xylene, dimethylsulfoxide, dimethyl formamide, and a combination thereof.

11. The composition comprising a quantum dot of claim 8, wherein the passivated quantum dot is present in an amount of about 0.1 to about 20 wt % based on the total amount of the composition comprising the quantum dot.

12. A method of preparing a passivated quantum dot, the method comprising:
    preparing a solution including a multidentate oligomer by reacting a first monomer having at least three thiol groups (—SH) at the terminal end and a second monomer having at least two functional groups at the terminal end being capable of reacting with the thiol groups and a spacer group between the at least two functional groups, and
    mixing the solution with a quantum dot to attach the thiol groups of the multidentate oligomer on the surface of the quantum dot,
    wherein the second monomer is selected from cycloalkanediol di(meth)acrylate, alkanediol di(meth)acrylate, 2,2'-(ethylenedioxydiethane)dithiol, 9,9-bis[4-(2-(meth)acryloyloxy ethoxy) phenyl]fluorene, 2,2-bis[4-((meth)acryloxy polypropoxy)phenyl]propane, alkylene glycol di(meth)acrylate, tris(2-acryloxyethyl) isocyanurate, trimethylol propane tri(meth)acrylate, ditrimethylol propane tetra(meth)acrylate, 2,2-bis[4-((meth)acryloxyethoxy)phenyl]propane, neopentylglycol di(meth)acrylate, and a combination thereof.

13. A film including the passivated quantum dot according to claim 1.

14. A device including the passivated quantum dot according to claim 1.

15. A quantum dot passivated by a oligomer or a polymer by forming a three-dimensional network on a surface of the quantum dot, the oligomer or the polymer is obtained by reacting a first monomer having at least three thiol groups and a second monomer having at least two functional groups that are capable of reacting with the thiol groups and a spacer group between the at least two functional groups,
    wherein the second monomer is selected from cycloalkanediol di(meth)acrylate, alkanediol di(meth)acrylate, 2,2'-(ethylenedioxydiethane)dithiol, 9,9-bis[4-(2-(meth)acryloyloxy ethoxy) phenylfluorene, 2,2-bis[4-((meth)acryloxy polypropoxy)phenyl]propane, alkylene glycol di(meth)acrylate, tris(2-acryloxyethyl) isocyanurate, trimethylol propane tri(meth)acrylate, ditrimethylol propane tetra(meth)acrylate, 2,2-bis[4-((meth)acryloxyethoxy)phenyl]propane, neopentylglycol di(meth)acrylate, and a combination thereof.

* * * * *